(12) United States Patent
Seto

(10) Patent No.: US 6,804,745 B2
(45) Date of Patent: Oct. 12, 2004

(54) DISC ACCESS APPARATUS AND DISC ACCESS METHOD

(75) Inventor: Koshi Seto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 285 days.

(21) Appl. No.: 10/180,019

(22) Filed: Jun. 27, 2002

(65) Prior Publication Data

US 2003/0004592 A1 Jan. 2, 2003

(30) Foreign Application Priority Data

Jun. 29, 2001 (JP) ......................................... 2001-200017

(51) Int. Cl.[7] .............................................. G06F 12/00
(52) U.S. Cl. ...................................... 711/111; 707/205
(58) Field of Search ........................... 711/4, 111–112; 707/10, 200, 205; 369/83

(56) References Cited

U.S. PATENT DOCUMENTS 4,825,354 A * 4/1989 Agrawal et al. .............. 707/10
5,668,970 A    9/1997 Cowart et al. ............... 711/206
6,278,678 B1 * 8/2001 Iida ............................ 369/83
6,477,616 B1 * 11/2002 Takahashi .................... 711/111
2002/0032691 A1 * 3/2002 Rabii et al. .................. 707/200

FOREIGN PATENT DOCUMENTS

| JP | 4-350741   | 12/1992 |
| JP | 6-342394   | 12/1994 |
| JP | 11-232838  | 8/1999  |
| TW | 173399     | 11/1991 |

* cited by examiner

Primary Examiner—Nasser Moazzami
(74) Attorney, Agent, or Firm—Oblon, Spivak, McClelland, Maier & Neustadt, P.C.

(57) ABSTRACT

A memory has a song table SGT and a folder address table FoAT. The FoAT stores a folder address representing a position of each folder read out from a CD. The SGT has the number of bits equal to the number of files in all folders read out from the CD and a bit corresponding to an initial file in the respective folder is set to "1" and that corresponding to another file is set to "0". When a program number is designated from an operation panel, reference is made to the SGT and FoAT and access is gained to the CD.

15 Claims, 5 Drawing Sheets

DISC ACCESS APPARATUS AND DISC ACCESS METHOD

CROSS-REFERENCE TO RELATED APPLICATIONS

This application is based upon and claims the benefit of priority from the prior Japanese Patent Application No. 2001-200017, filed Jun. 29, 2001, the entire contents of which are incorporated herein by reference.

BACKGROUND OF THE INVENTION

1. Field of the Invention

The present invention relates to a disc access apparatus and method for gaining access to, for example, a CD-ROM (Compact Disc ROM) having compressed music data files, etc., recorded therein and a CD-R (Compact Disc Recordable) having recorded music data files, etc., created by a computer.

2. Description of the Related Art

In recent years, various music data file compression techniques have been developed alongside the rapid advances in digital audio. As such compression techniques, there are MP3 (MPEG-1, Audio layer-III), AAC (Advanced Audio Coding), WMA (Windows Media Audio) and so on. Further, CD-ROMs with recorded music data files compressed by the use of such compression techniques are commercially available and CD-Rs are available in which music data files compressed by the use of a personal computer are recorded.

In the case of the audio CD, the number of programs recordable in the CD is restricted to 99 at max. In the case where a music data file (hereinafter referred to as an MP3 file) is recorded as a file compressed by, for example, MP3 in the CD-ROM and CD-R, the number of recordable programs, that is, the number of MP files, is practically unlimited. It is, therefore, possible to record a greater number of programs in the CD-ROM and CD-R as long as the recording capacity allows it.

FIG. 8 diagrammatically shows the logic format of a CD-ROM. This logic format controls a file with the use of a directory or folder concept. Here, it is to be noted that the directory and folder are used to mean the same thing. The address of a plurality of folders 1, 2, . . . , n, with an MP3 file stored therein, together with the address of the root directory, are recorded in a path table. The address of each folder and address of the root directory are managed with the use of the path table. Although, in FIG. 8, the folders are shown as constituting a one-layer structure, if any subfolders are provided in the respective folder, the address of the subfolder is managed by the path table.

In the case where, in the logic format thus arranged, a required MP3 file is to be searched, it is necessary to sequentially trace the root directory, folder and MP file by referring to the path table. It, therefore, takes longer to make such a search. For this reason, in the case where, in particular, any program largely distant from a currently played-back program is reproduced without sequentially reproducing continuous programs, it takes longer to reach that program for reproduction.

It is considered that, when a CD-ROM or CD-R is set in a reproducing device for reproduction, a table is created in an initializing stage which can gain direct access to a memory of the reproducing apparatus to get an MP3 file.

FIG. 9 shows one form of a table FAT created in a memory. The table FAT comprises file names of the MP3 file and addresses representing, for example, head addresses of the MP3 file. In the table FAT, the file name and address are stored in a way to correspond to a given program. Such a table is created in the initializing stage with the CD-ROM or CD-R set in the reproduction device. When a desired program number is designated, direct access can be made to the MP3 file corresponding to the program number by referring to the table. Therefore, it is possible to search a desired program at high speed. Further, the file name (program name) can be displayed by reading out a file name corresponding to the searched program.

In general, however, the address of the file is allowed to have a length of a few bytes and the file name is allowed to have a length of, for example, about 128 bytes. Further, the number of files recorded in the CD-ROM or CD-R is substantially unlimited. For this reason, there is a problem that, when many files are involved, the size of the table becomes greater and it is necessary to provide a memory section of a greater capacity. Therefore, a need is created for a disc access apparatus and method which, even if a greater number of files are involved, can achieve a high-speed search and require no memory section of a greater capacity.

BRIEF SUMMARY OF THE INVENTION

According to an aspect of the present invention, there is provided a disc access apparatus comprising a storage section configured to store data from a reproducing section configured to reproduce data stored in a disc, the storage section including a first table for storing a folder address representing a position of each folder read out from the disc and a second table for setting, to a first value, a bit corresponding to an initial file in the read-out respective folder and setting a bit corresponding to another file to a second value.

According to an aspect of the invention, there is provided a disc access method comprising the steps of storing, in a first table, a folder address representing a position of each folder read out from a disc and setting, to a first value, a bit corresponding to an initial file in the read-out respective folder in a second table and setting a bit corresponding to another file in the second table to a second value.

DETAILED DESCRIPTION OF THE INVENTION

An embodiment of the present invention will be described below with reference to the accompanying drawing.

Figure 1:
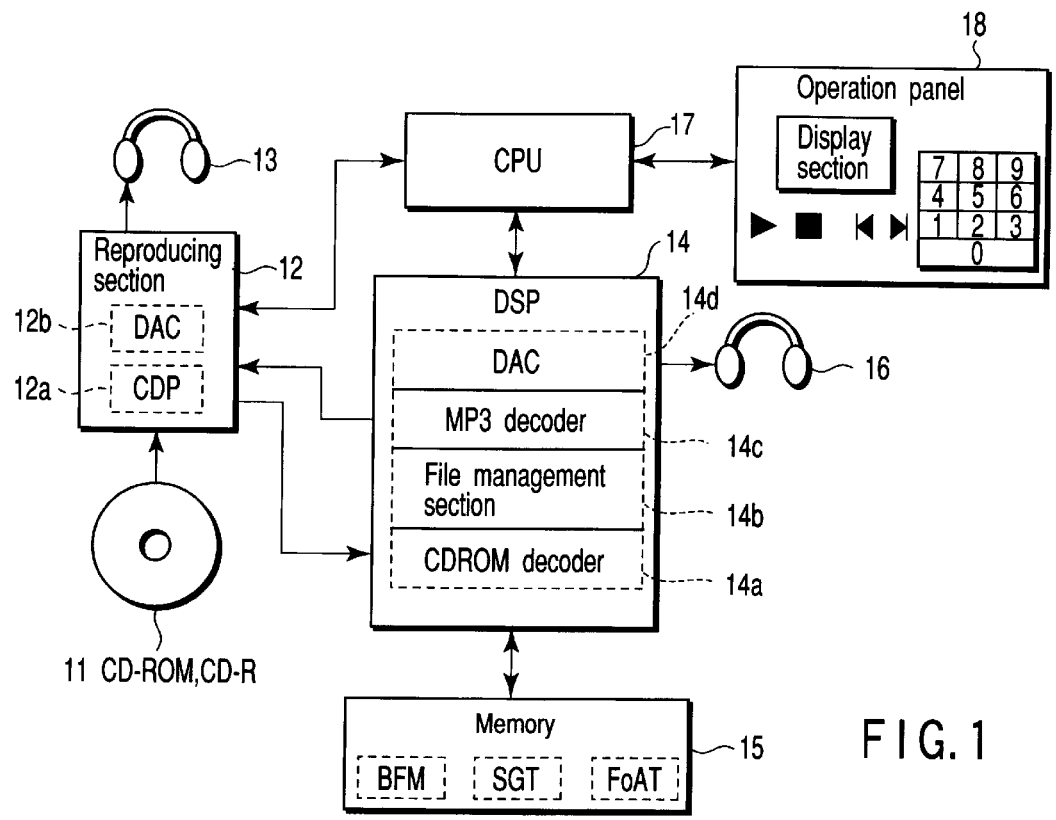
FIG. 1 is a schematic view showing a disc access apparatus according to one embodiment of the present invention.

FIG. 1 shows a disc access apparatus according to one embodiment of the present embodiment. This apparatus is based on for example, a portable type CD player, but is not restricted to the portable type.

In FIG. 1, CD 11 includes a CD-ROM, a CD-R and audio CD. The CD 11 is loaded into a reproducing section 12. The reproducing section 12 is a conventionally known apparatus for reproducing data recorded in the CD 11 and has an optical pick-up, not shown, a CD processor (CDP) 12a and a digital/analog converter (DAC) 12. The optical pick-up directs a laser beam to the CD 11 set in the reproducing section 12 and converts the light beam which is reflected from the CD 11 to an electric signal and outputs it. The output signal from the optical pick-up is supplied to the CDP 12a.

The CDP 12a produces a 16 bits×2 channels×44.1 kHz signal per second from a signal supplied from the optical pick-up. In the case where the CD 11 set in the reproducing section 12 is comprised of an audio CD, an output signal from the CDP 12a is a digital stereophonic signal of the above-mentioned bit rate.

Figure 8:
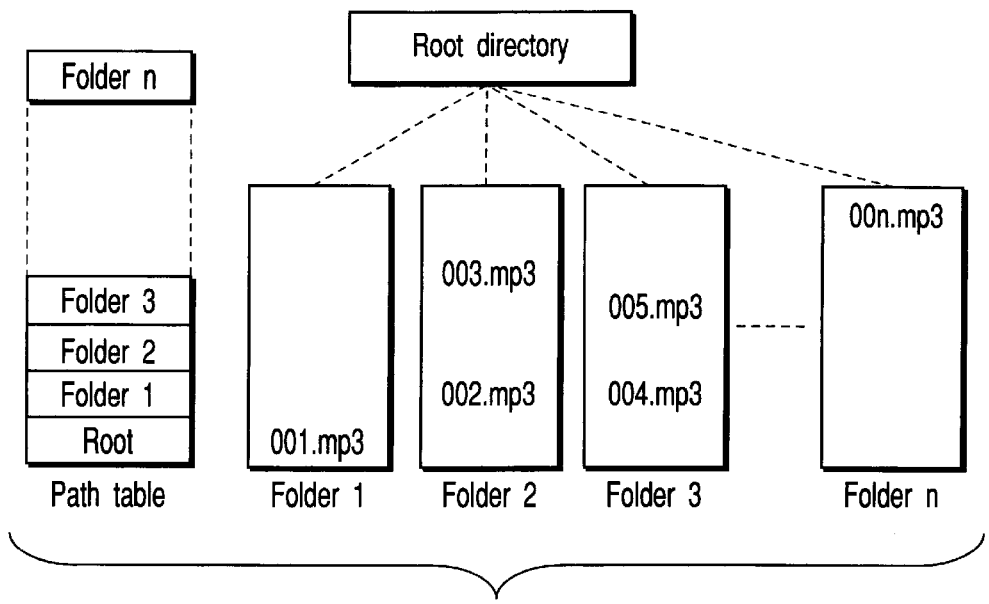
FIG. 8 is a view diagrammatically showing a logic format for a CD-ROM.

In the case where the CD 11 set in the reproducing section 12 is comprised of a CD-ROM or CD-R, an output signal from the CDP 12a is a 2-channel digital signal having the above-mentioned bit rate and contains, for example, a folder and MP3 file. The logic format of the CD-ROM and CD-R is as shown in FIG. 8.

The DAC 12b converts the above-mentioned digital stereophonic signal to an analog stereophonic signal. In the case where an audio CD is set in the reproducing section 12, the digital stereophonic signal which is outputted from the CDP 12a is converted by the DAC 12b to an analog stereophonic signal. The analog stereophonic signal can be reproduced by connecting, for example, a headphone 13 to the output terminal of the DAC 12b.

The above-mentioned digital signal which is outputted from the CDP 12a of the reproducing section 12 is supplied to the digital signal processor (DSP) 14. The DSP 14 includes, for example, a CD-ROM decoder 14a, a file management section 14b, MP3 decoder 14c and a DAC 14d. A memory 15 is connected to the DSP 14. The memory 15 is comprised of, for example, a static RAM (SRAM). The memory 15 includes a buffer memory BFM and, further, stores a song table SGT and folder address table FoAT as will be described later. A signal which is outputted from the CDP 12a is stored in the buffer memory BFM of the memory 15.

The CD-ROM decoder 14a descrambles the digital signal stored in the buffer memory BFM and performs an error correction. The file management section 14b searches the MP3 file by an output signal of the CD-ROM decoder 14a. The MP3 decoder 14c decodes the MP3 file searched by the file management section 14b. This signal is supplied to, for example, a DAC 14d and converted to an analog stereophonic signal. Therefore, the analog stereophonic signal can be reproduced by connecting, for example, a headphone 16 to an output terminal of the DAC 14d.

The output signal of the MP3 decoder 14c can be sent back to the reproducing section 12. In this case, the digital stereophonic signal which is outputted from the MP3 decoder 14C is converted to the analog stereophonic signal by means of the DAC 12b and it can be reproduced by the headphone 13.

The reproducing section 12 and DSP 14 are connected to a CPU 17 serving as a controller. An operation panel 18 is connected to the CPU 17 and has, for example, play-back, pause, skip keys and ten keys. The CPU 17 controls the reproducing section 12, DSP 14 and operation panel 18. For example, the CPU 17 controls, in response to the operation of the operation panel 18, the search of the MP3 file recorded on the CD 11 through the reproducing section 12 and a play-back operation.

The operation will be described below with reference to FIGS. 2 to 5.

Figure 2:
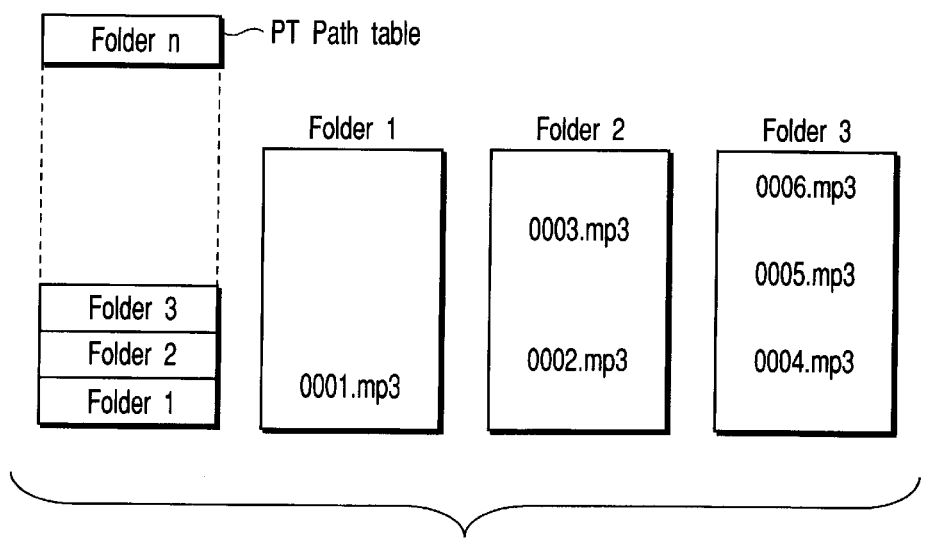
FIG. 2 is a view showing one practical form of a logic structure for data recorded on a CD.

FIG. 2 is one example of a logic format of data recorded on the CD 11. Here, only a path table PT and a plurality of folders managed by the path table PT are shown. The MP3 file is contained in the respective folder. The number of files in the folder is not restricted to 2.

In order to be able to search a required program at high speed even if the number of data (programs) able to gain direct access to the corresponding addresses exceeds a predetermined program number in this embodiment, a song table SGT and folder address table FoAT are created in the memory 15.

Figure 3:
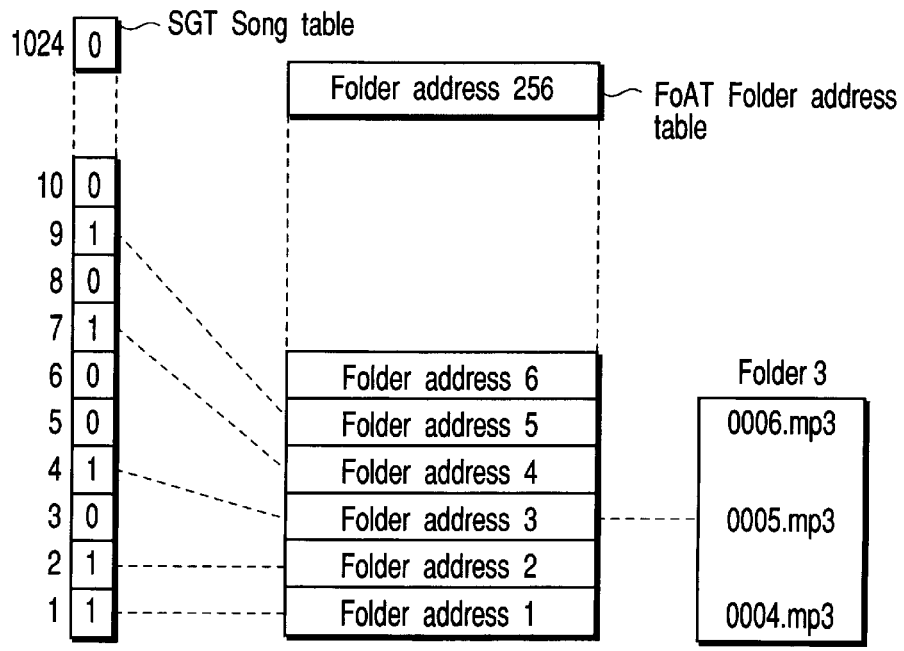
FIG. 3 is a view diagrammatically showing a relation of a song table to a folder address table.

FIG. 3 shows a practical example of the song table SGT and of the folder address table FoAT. The address of the folders recorded in the CD 11 are sequentially recorded in the folder address table FoAT.

Figure 4:
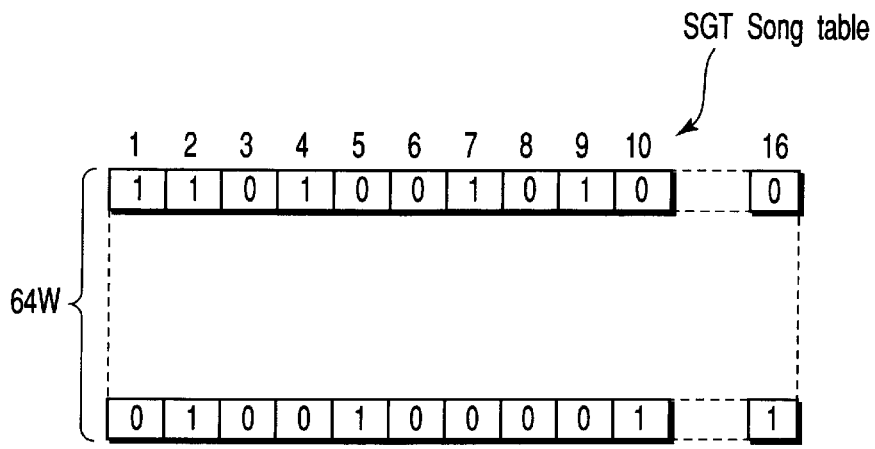
FIG. 4 is a view diagrammatically showing the song table.

On the other hand, the song table SGT has a memory capacity of, for example, 16 bits/word×64 words, that is, 1024 bits, as shown in FIG. 4. The song table SGT is such that a respective MP3 file in the CD 11 corresponds to each bit as shown in FIG. 3. The respective bit corresponds to the MP3 file in the folder which corresponds to the folder address recorded in the folder address table FoAT. Further, each bit is set to "1" when its corresponding MP3 file is a first program in the folder and to "0" when its corresponding MP3 file is not a first program. That is, in the song table SGT, the bit in which "1" is set shows a folder boundary.

Those folder addresses 1 to 3 in the holder address table FoAT as shown in FIG. 3 correspond to the folders 1 to 3 and those up to a fifth bit position in the song table SGT correspond to the MP3 file in the folders 1 to 3 shown in FIG. 2.

It is to be noted that, in the folder address table FoAT, the folder name may be stored in a way to correspond to the respective folder address.

Figure 5:
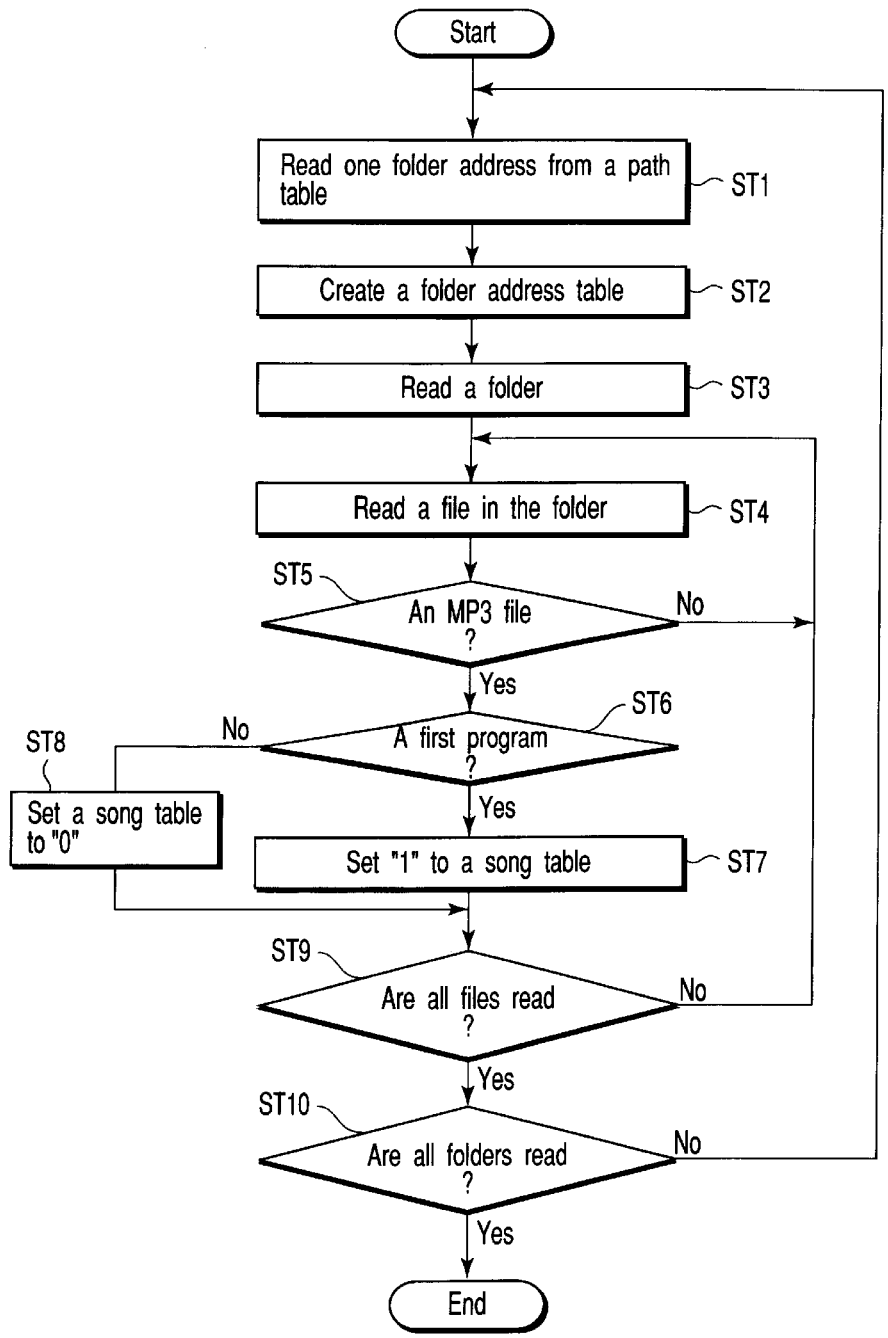
FIG. 5 is a flow chart showing an operation for creating the song table and folder address table.

FIG. 5 shows an operation for creating the song table SGT and folder address table FoAT. The song table SGT and folder address table FoAT are created, for example, in an initializing stage when the CD 11 is set to the reproducing section 12.

First, the address of the first folder is read out by the reproducing section 12 from the path table of the CD 11 (ST1). The read-out folder address is supplied to the memory 15 and written into the folder address table FoAT (ST2). Then the folder corresponding to the read-out folder address is read out from the CD11 (ST3). After this, the file in the folder thus read out is read out from the CD 11 (ST4). It is decided whether or not the read-out file is the MP3 file (ST5). That is, if the CD 11 is a CD-R, it is necessary to detect only the MP3 file because there is a possibility that any file other than the MP3 file will be recorded in the CD 11. If that file is decided as a file other that the MP3 file, then the next file is read in (ST5-ST4).

If, on the other hand, the above-mentioned file is decided as the MP3 file, this MP3 file is decided as to whether or not it is the first program in the folder (ST6). If YES, "1" is set to a bit position corresponding to this file in the song table SGT (ST7). If NO, "0" is set to the bit position corresponding to this file in the song table SGT (ST8).

When the processing of one file is thus completed, then it is decided whether or not the reading-in of all the files in that folder has been completed (ST9). If NO, the next file is read in and the above-mentioned operation is performed (ST9-ST4). If YES as a result of decision, it is decided whether or not the reading-in of all the folders in the CD 11 has been completed (ST10). If NO, the next file is read in and the same operation as set out above is performed (ST10-ST1). If YES, the process is ended.

By doing so, the song table SGT and folder address table FoAT are created in the memory FoAT.

The accessing of the MP3 file recorded in the CD 11 will be described below with the use of the song table SGT and folder address table FoAT.

Figure 6:
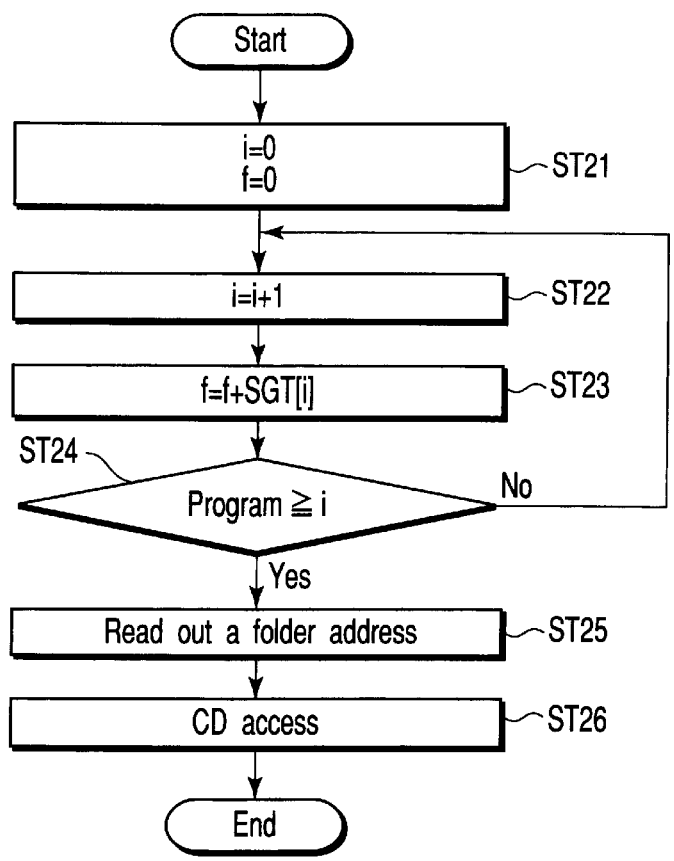
FIG. 6 is a flow chart showing an operation upon access to an MP3 file.

FIG. 6 is a flow chart showing the operation of gaining access to the MP3 file. Here, with reference to FIG. 3, an explanation will be made below about the operation of designating, for example, a fifth program via the ten keys in the operation panel 18 in FIG. 1.

In the example of FIG. 3, the fifth program "0005.mp3" corresponds to a second program in the folder 3. In the case where the MP3 file recorded in the CD 11 is accessed with the use of the song table SGT and folder address table FoAT, "1" set in the song table SGT is counted to detect a folder boundary and access is gained to a file in the corresponding folder.

That is, in FIG. 6, first, a counter "i" for counting a program number is reset to "0" and a counter "f" for counting the folder number is reset to "0" (ST21).

After this, the folder number is counted (ST22) and the program number is counted (ST23). The counter "f" counts the folder number by counting the content (SGT[i]) of the bit position of the song table SGT designated by the counter "i". That is, when the value of the counter "i" is "1", then the value of the "1" bit position of the song table SGT is "1". For this reason, the value of the counter "f" is "1". In this way, the folder number is counted.

Then, it is decided whether or not the value of the program number counter "i" is equal to, or greater than, the designated program number (ST24). If, as a result of decision, the value of the program number counter "i" is less than the designated program number, the counter "i" is counted up and, with this, the counter "f" is also counted up in accordance with the value of the song table SGT (ST24, ST22, ST23).

If, on the other hand, the value of the counter "i" is equal to, or greater than, the designated program number, then a folder address is read out from the folder address table FoAT at a position corresponding to a value of the counter "f" (ST25). In this case, when the value of the counter "i" is "5", the value of the counter "f" is "3" and a third folder address 3 is read out from the folder address table FoAT. This read-out folder address 3 is supplied from the memory 15 to the reproducing section 12 and CD 11 is accessed in accordance with the folder address 3 (ST26). That is, based on the folder address 3, a corresponding folder in the CD 11 is accessed to read out a desired MP3 file in the folder.

According to the above-mentioned embodiment, the memory 15 includes the folder address table FoAT for sequentially recording folder addresses recorded in the CD 11 and the song table SGT with a respective MP3 file in the CD 11 corresponding to the bit. In order to represent a folder boundary, the respective bit of the song table SGT is set to data "1" in the case where the MP3 file corresponds to the first program in the folder and to data "0" in the case where the respective bit of the song table SGT is not the first program. If, therefore, a desired program number is designated, the data "1" representing the folder boundary set in the song table SGT counted and, by doing so, the folder number corresponding to its program number can be detected at high speed. Further, the address of the folder corresponding to the folder number is read out from the folder address table FoAT and, by gaining access to the CD 11 by the read-out folder address, it is possible to access the MP3 file corresponding to the designated program number at high speed. It is also possible to reduce the wait time for a selected program even in the case where, for example, a program very far from a currently selected program is to be played back.

Figure 9:
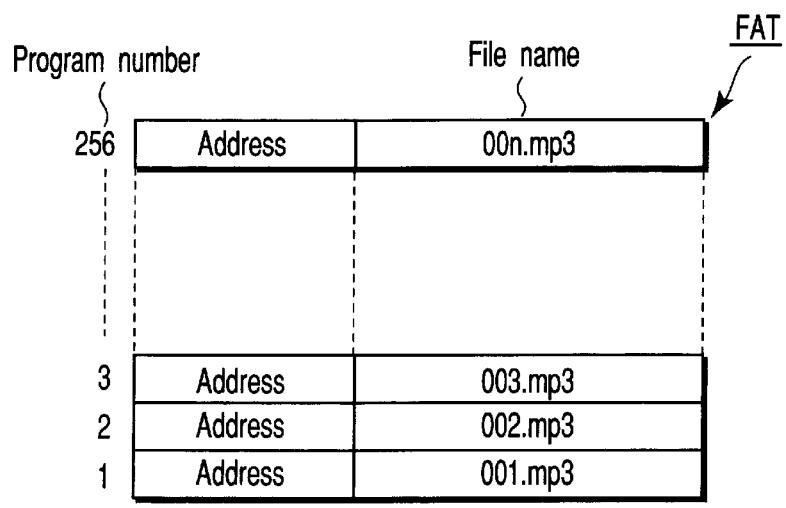
FIG. 9 is a view showing one example of a conventional table created in a memory.

Further, the song table SGT created in the memory 15 need only have a bit number capacity corresponding to the number of MP3 files in the CD 11 and the folder address table FoAT need only have a capacity capable of storing those addresses corresponding to the number of folders involved. Therefore, the song table SGT and folder address table FoAT may have much less storage capacities than the capacity of the table shown in FIG. 9 and have an advantage of being capable of reducing the storage capacity of the memory 15.

It is to be noted that the above-mentioned song table SGT need not have a restricted capacity corresponding to, for example, the first to 256th programs. That is, if the memory capacity is permitted, it is possible to apply a searching method shown in FIG. 9 to the above-mentioned practical form of the present invention. If this method is adopted, it is possible to apply the searching method shown in FIG. 9 to the first to 256th programs at high speed and, if access is gained to more than 256 programs, to adopt the above-mentioned procedure. By doing so it is possible to prevent a searching rate from being lowered to an extreme extent.

Figure 7:
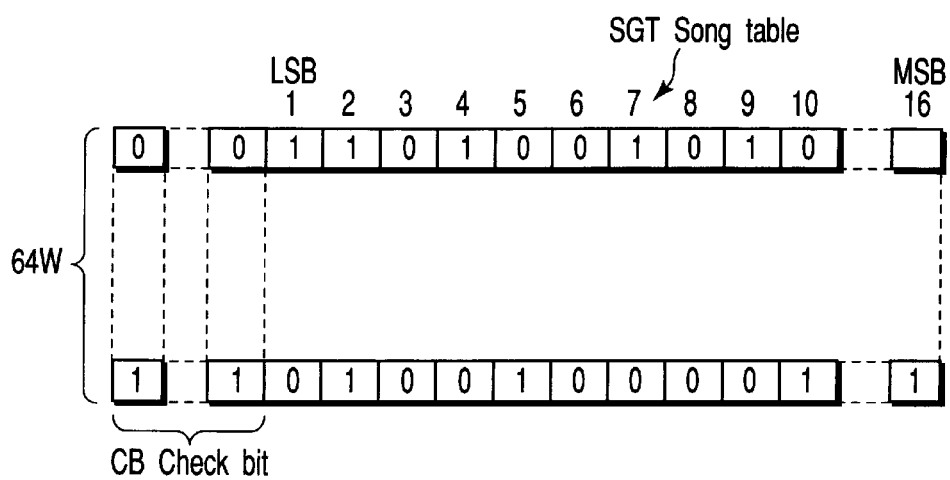
FIG. 7 is a view diagrammatically showing a variant of the song table.

FIG. 7 shows a variant of the above-mentioned embodiment. In this variant, a check bit CB format corresponding to each word is added to, for example, an LSB side of a song table SGT. This check bit CB format is comprised of, for example, a plurality of bits. By the addition of the check bits CB it is possible to verify the reliability of the song table SGT in word units.

Although the above-mentioned embodiment has been explained as being applied to the CD-ROM and CD-R having recorded an MP3 file, this invention is not restricted to the recording file format of MP3, and is applicable to other file formats such as AAC or WMA.

Further, the CD is not restricted to CD-ROM and CD-R and the present invention is applicable to the use of CD-RW (Compact Disc Rewritable) and MD (Mini Disc).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc access apparatus comprising:
    a storage section configured to store data supplied from a reproducing section configured to reproduce data stored in a disc,
    the storage section including:
    a first table configured to store a folder address representing the position of a respective folder read out from the disc; and a second table in which a bit corresponding to a first file in the read-out respective folder is set to a first value and a bit corresponding to another file is set to a second value.

2. The apparatus according to claim 1, further comprising:

an operation section configured to designate the operation of the reproducing section; and a control circuit connected to the reproducing section and operation section, the control circuit being configured to find a folder number by counting the first value which is stored in the second table of the storage section in accordance with a file number inputted from the operation section, read out the address of a folder corresponding to the found folder number, and control the reproducing section based on the address.

3. The apparatus according to claim 1, wherein the disc is one selected from the group consisting of a CD, CD-ROM, CD-R, CD-RW and MD.

4. The apparatus according to claim 1, wherein a format of the file is at least MP3.

5. A disc access apparatus comprising:

a reading section mounted in a disc and configured to read out data recorded in the disc;

a decoding section configured to decode data read out from the reading section;

an operation section configured to designate the operation of the reading section;

a control section connected to the operation section, reading section and decoding section and configured to control the operations of the reading section and decoding section in accordance with the designation of the operating section; and a storage section connected to the decoding section, the storage section including a first table configured to store a folder address representing the position of each folder read out from the disc and a second table in which a bit corresponding to a first file in the read-out respective folder is set to a first value and a bit corresponding to another file is set to a second value, and the control section being configured to find a folder number by counting a first value which is stored in the second table of the storage section in accordance with the file number inputted from the operation section, read out the address of the folder corresponding to the found folder number and control the reading section based on the address and gain access to the disc.

6. The apparatus according to claim 5, wherein the disc is one selected from the group consisting of a CD, CD-ROM, CD-R, CD-RW and MD.

7. The apparatus according to claim 5, wherein a format of the file is at least MP3.

8. A disc access method comprising:

storing, in a first table, a folder address representing a position of each folder read out from a disc; and setting, to a first value, a bit corresponding to an initial file in the read-out respective folders in the second table and setting a bit corresponding to another file in the second table to a second value.

9. The method according to claim 8, further comprising:

counting the first value which is stored in the second table in accordance with a file number inputted from an operation section and finding a folder number;

reading out the address of the folder corresponding to the found folder number; and gaining access to the disc based on the address.

10. The method according to claim 8, wherein the disc is one selected from the group consisting of a CD, CD-ROM, CD-R, CD-RW and MD.

11. The method according to claim 8, wherein a format of the file is at least MP3.

12. A disc access method comprising:

reading out a folder address representing a position of each folder from a disc;

storing the folder address in a first table;

reading out a folder corresponding to the folder address from the disc;

reading out a file in the read-out folder from the disc;

when the read-out file is a first file in the folder, setting a bit corresponding to the first file in a second table to a first value; and, when the read-out file is other than the first file in the folder, setting the bit corresponding to this file in the second table to a second value.

13. The method according to claim 12, further comprising:

counting the first value which is stored in the second table in accordance with a file number inputted from an operation section;

reading out the address of the folder corresponding to the found folder number from the first table; and gaining access to the disc based on the address.

14. The method according to claim 12 wherein the dick is one selected from the group consisting from a CD, CD-ROM, CD-R, CD-RW and MD.

15. The method according to claim 12, wherein a format of the file is at least MP3.

* * * * *